US012763575B2

(12) United States Patent
Petersen et al.

(10) Patent No.: US 12,763,575 B2
(45) Date of Patent: Oct. 13, 2026

(54) METHOD FOR AUTOMATIC STABILITY DETECTION OF A REGULATOR CASCADE

(71) Applicant: Lenze SE, Aerzen (DE)

(72) Inventors: Thomas Petersen, Braunschweig (DE); Ingo Snyders-Glocke, Hameln (DE); Roland Luecken, Neustadt (DE); Thomas Eutebach, Hameln (DE)

(73) Assignee: Lenze SE, Aerzen (DE)

( * ) Notice: Subject to any disclaimer, the term of this patent is extended or adjusted under 35 U.S.C. 154(b) by 379 days.

(21) Appl. No.: 18/223,621

(22) Filed: Jul. 19, 2023

(65) Prior Publication Data

US 2024/0079872 A1 Mar. 7, 2024

(30) Foreign Application Priority Data

Jul. 19, 2022 (DE) ..................... 10 2022 207 368.1

(51) Int. Cl.
*H02J 3/0012* (2026.01)
*H02J 3/001* (2026.01)

(52) U.S. Cl.
CPC .................................. *H02J 3/0012* (2020.01)

(58) Field of Classification Search
CPC .. H02J 3/383; H02J 3/386; H02J 3/382; H02J 3/387; H02J 3/18; H02J 3/0012
See application file for complete search history.

(56) References Cited

U.S. PATENT DOCUMENTS 6,004,017 A 12/1999 Madhavan
9,444,257 B2 * 9/2016 Wells ........................ H02J 3/16
10,063,055 B2 * 8/2018 Matan .................... G01R 11/54
10,128,660 B1 * 11/2018 Apte ....................... H02J 3/381
2003/0074895 A1 * 4/2003 McFarland ............. F01K 25/10 60/395
2003/0081438 A1 * 5/2003 Dinh ....................... H02J 1/102 363/127
2009/0005886 A1 * 1/2009 Gao ....................... G05B 13/02 700/29
2009/0021966 A1 * 1/2009 Jacobson ................ H02M 1/34 363/52

(Continued)

OTHER PUBLICATIONS

German-language Office Action issued in German Application No. 10 2022 207 368.1 dated Jul. 19, 2023 (4 pages).

*Primary Examiner* — Nicholas Augustine
(74) *Attorney, Agent, or Firm* — Crowell & Moring LLP

(57) ABSTRACT

A method automatically detects stability of a regulator cascade having a number of cascaded regulators. A regulation error of a respective regulator is processed by the respective regulator and the processed regulation error is output as a regulator manipulated variable. A reference variable for the respectively downstream regulator in the regulator cascade is ascertained as a function of the regulator manipulated variable. The method includes: ascertaining an energy content of a respective regulation error; ascertaining whether an absolute value of a respective regulator manipulated variable exceeds an associated limiting value or not; and generating a stability measure for the regulator cascade as a function of the energy contents of the respective regulation errors and as a function of whether the respective regulator manipulated variables exceed their associated limiting values or not.

8 Claims, 1 Drawing Sheet

(56) References Cited

U.S. PATENT DOCUMENTS

| | | | | |
|---|---|---|---|---|
| 2009/0056944 | A1 * | 3/2009 | Nitschke | E21B 43/40<br>166/272.3 |
| 2014/0368045 | A1 * | 12/2014 | Conry | H02J 3/28<br>307/75 |
| 2016/0239015 | A1 * | 8/2016 | Heiler | G05B 19/406 |
| 2018/0278057 | A1 * | 9/2018 | Wells | G01R 19/2513 |
| 2019/0044340 | A1 * | 2/2019 | Jacobson | G05B 19/042 |
| 2020/0225655 | A1 * | 7/2020 | Cella | G05B 13/028 |
| 2022/0103106 | A1 * | 3/2022 | Grüner | H02P 6/08 |
| 2022/0401904 | A1 * | 12/2022 | Sarron | B01J 8/0285 |

* cited by examiner

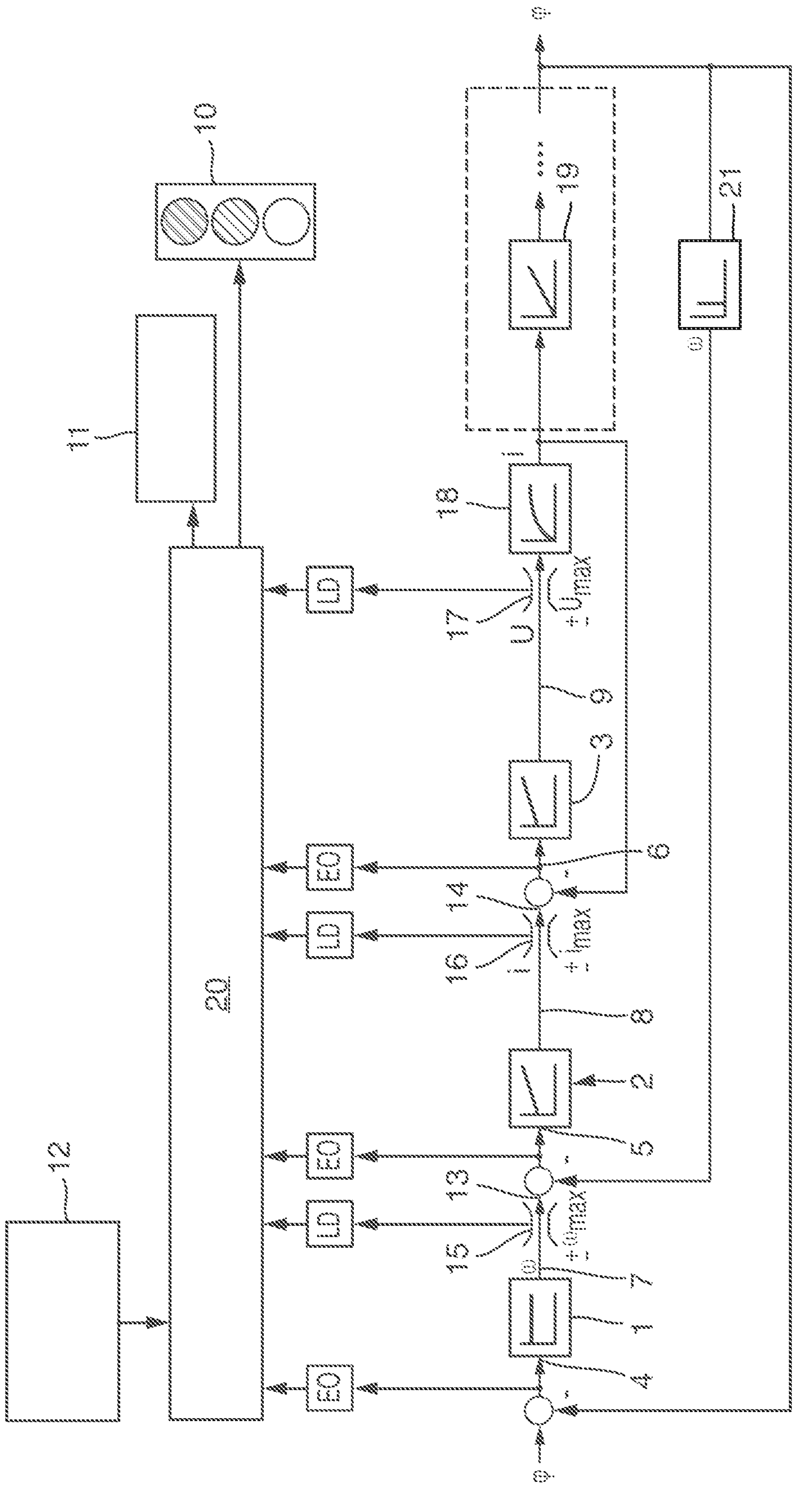
10
11
12
20
LD
EO
LD
EO
LD
EO
LD
1
2
3
4
5
6
7
8
9
13
14
15
16
17
18
19
21
100
U
$\pm U_{max}$
$\pm i_{max}$
$\pm \omega_{max}$

METHOD FOR AUTOMATIC STABILITY DETECTION OF A REGULATOR CASCADE

BACKGROUND AND SUMMARY

The invention is based on the object of providing a method for automatic stability detection of a regulator cascade, which can detect possible instabilities of the regulator cascade as simply and reliably as possible.

The method is used for automatic stability detection of a regulator cascade. The regulator cascade typically has a number, for example between 1 and 6, of cascaded regulators. A regulation error of a respective regulator is processed by the respective regulator according to its regulation algorithm and the processed regulation error is typically output by the respective regulator as a regulator manipulated variable. A reference variable for the respective downstream regulator in the regulator cascade is ascertained as a function of the regulator manipulated variable of the respective upstream regulator in the regulator cascade. A regulation error designates in this case the difference between the target value or reference variable and actual value of the variable to be regulated. Reference is made to the relevant technical literature with regard to the fundamental structure of regulator cascades.

The method comprises the following steps:

a) ascertaining an energy content of a respective regulation error, b) ascertaining whether an absolute value of a respective regulator manipulated variable exceeds an associated limiting value or not, and c) generating a stability measure for the regulator cascade as a function of the energy contents of the respective regulation error and/or as a function of whether the respective regulator manipulated variables exceed their associated limiting values or not.

The stability measure depicts the stability of the individual control loops of the regulator cascade or the stability of the entire regulator cascade. The stability measure can be embodied, for example, as a measured value having a predetermined value range. The value range can extend, for example, between 0 and 10, wherein 0 corresponds to a maximum stability and 10 corresponds to a maximum instability. The stability measure can also be designed, for example, as a stability traffic signal, wherein, for example, green corresponds to a high stability, yellow corresponds to a beginning instability, and red corresponds to an instability, etc.

In one embodiment, the ascertainment of the energy content of the respective regulation error is carried out by means of energy operators.

In one embodiment, upon an increase of the energy contents of the respective regulation errors, the stability measure is generated or changed such that it indicates an increasing instability of the regulator cascade.

In one embodiment, for the case that the absolute values of the respective regulator manipulated variables exceed their associated limiting values, the stability measure is generated or changed such that it indicates an increasing instability of the regulator cascade.

In one embodiment, steps a) to c) are repeated in a fixed time grid, for example every 100 ms.

In one embodiment, the regulators of the regulator cascade are selected from the set of regulators consisting of: position regulators, speed regulators, and current regulators.

In one embodiment, diagnosis and action information is generated as a function of the energy contents of the respective regulation errors and as a function of whether the absolute values of the respective reference variables generated by means of the regulators exceed their associated limiting values or not.

In one embodiment, the stability measure is furthermore generated as a function of pre-determinable properties of the regulator cascade.

The invention will be described in detail hereinafter with reference to the drawing.

BRIEF DESCRIPTION OF THE DRAWING

FIG. 1 shows, by way of example, a regulator cascade having a number of cascaded regulators, which is designed to execute the method according to the invention.

DETAILED DESCRIPTION OF THE DRAWING

FIG. 1 shows a regulator cascade 100 having three cascaded regulators 1, 2, 3, wherein a regulation error 4, 5, or 6 of a respective regulator 1, 2, or 3 is processed by the respective regulator 1, 2, or 3 and the processed regulation error 4, 5, or 6 is output as a regulator manipulated variable 7, 8, or 9. A reference variable 13 or 14 for the respective downstream regulator 2 or 3 in the regulator cascade 100 is ascertained as a function of the regulator manipulated variable 7 or 8. Reference is also made in this regard to the relevant technical literature.

According to the invention, an energy content of a respective regulation error is calculated.

Limiters 15, 16, and 17 ascertain whether an absolute value of a respective regulator manipulated variable 7, 8, or 9 exceeds an associated limiting value or not, and if necessary limit the regulator manipulated variable 7, 8, 9 to the associated limiting value.

Finally, a stability measure 10 for the regulator cascade 100 is ascertained as a function of the energy contents of the respective regulation errors 4, 5, 6 and as a function of whether the respective regulator manipulated variables 7, 8, 9 exceed their associated limiting values or not. The stability measure is symbolized by way of example in the present case by a traffic signal, wherein a green traffic signal symbolizes a high stability, a yellow traffic signal symbolizes a beginning instability, and a red traffic signal symbolizes instability.

The energy content of the respective regulation error 4, 5, 6 is ascertained by means of energy operators.

FIG. 1 shows a typical control loop cascade having control loops or regulators having a current regulator 3, a speed regulator 2, and a position regulator 1. The driven load is represented here by way of example as a simple one mass system having electrical section 18 and mechanical section 19. The element 21 is a conventional differentiating element.

Each regulator 1, 2, 3 has to be adapted to its control section to achieve a desired behavior. Thus, for example, the current regulator 3 has to be adapted to an inductance and a resistance of a motor, wherein, for example, a dead time, a variable of a power end stage which cannot be influenced, and a measured value acquisition are also incorporated in the calculation.

The speed regulator 2 in turn has to be adapted to a mechanism, wherein its properties have massive influence on the value range of the speed regulator setting. For single-mass systems, there is even a simple relationship between moment of inertia J and Vpn, but as soon as elasticities or slack come into play, the relationships become nonlinear and difficult to predict.

The position regulator 1 in turn sees as its section the underlying speed control loop, due to which its properties at least also have a massive effect on the setting of the position regulator Vp.

An initial setting of the regulators 1, 2, 3 is typically performed during a startup and then not adapted further. The initial setting is carried out according to criteria, for example, reaction time to target value changes, the capability of regulating out disturbances, or according to the aspect of how accurately the regulator follows the target value.

Finding the optimum setting can be complex in complex mechanisms. Particularly elastic elements such as toothed belts, long toothed racks, etc. often only permit very minor scope in finding a suitable parameter set. This also still applies if, for example, special filters are used for combating the problematic natural frequencies of the mechanism, such as notch filters or the like. A compromise then often has to be made in the regulator setting in which the original optimization goal goes into the background and the aspect of a stable and robust regulator setting becomes dominant. In general, the limits of the stable behavior are then approached quite closely, in order to at least partially achieve one's own optimization goals.

If this compromise has been found, there is still an interaction between mechanical properties and the resulting setting limits. If these mechanical properties then change due to aging or wear with time, it can often occur that the limit to the instable behavior is exceeded by the selected regulator setting.

If the regulator cascade then becomes unstable overall, damage can certainly be caused to the mechanism if this is not suppressed immediately. Since the machine is then usually in the field under production conditions, a person skilled in the art is not necessarily on location who can identify or correct the erroneous behavior.

The invention begins here.

One important variable in the regulation is the so-called regulation error, i.e., the value after the subtraction point of target value and actual value. The regulation error passes through the respective regulator and is passed on amplified therein to the next regulator as its target value or reference variable. At this transfer point, a (target value) limiter is typically arranged, which ensures that a permissible target value, for example, a maximum permissible current, a maximum permissible speed, etc., is not exceeded.

The invention is based on the finding that unstable control loops can be detected on the basis of excessive signal changes, which manifest in the regulation errors 4, 5, and 6 of the respective control loops.

The energy content of the respective regulation error 4, 5, and 6 can be used to distinguish whether it is a normal regulating procedure or an unstable situation. So-called Teager energy operators EO, for example according to Kaiser, which are known from the field of speech recognition, can be used for observation.

Since energy operators EO usually become inaccurate or even unusable with constant or limited signals, it is checked according to the invention whether the limiters 15, 16, and/or 17 become active. For this purpose, so-called limit detectors LD are used as additional information sources. By means of the LDs, it is ascertained whether an absolute value of a respective regulator manipulated variable 7, 8, 9 exceeds an associated limiting value or not. In other words, the LDs ascertain whether the limiters 15, 16, and/or 17 become active.

The EOs may be made deliberately sensitive for defined frequency ranges. They may therefore be tuned very accurately to the properties of the combination of machine and regulation.

After startup of the regulation, limiting values of the EOs may be determined and defined for the good case and the bad case. In addition, resonance frequencies can be ascertained here, to which the EOs are tuned. A monitoring logic 20 is supplied with this information. Furthermore, the monitoring logic 20 is supplied with rudimentary information 12 about the mechanical structure of the underlying facility.

In operation, the monitoring logic 20 now becomes active, which in addition to the values of the EOs, also detects the stop of the limiters 15, 16, and 17 by means of the LDs to execute the method according to the invention.

Regulations are often implemented in a time-discrete manner, i.e., the tasks of the regulation are executed on a computer in a defined time grid and in a defined sequence. The monitoring logic 20 is also coupled to this time grid, which thus acquires each control event and disturbance event.

Due to the simultaneity of the acquisition of all EOs and LDs, it can be detected in which control loop an oscillation first occurs. In addition, it can also be established via the energy content whether an instability is emerging or whether it is already active to its full extent. This can be used in order to output a report about the status of the control loops via the traffic signal system 10.

Since the location of the occurrence of the instability can also be detected, targeted measures can also be recommended. For example, if the current control loop becomes unstable, something must have changed in the electrical properties of the motor or the inverter, which can be ascertained more accurately by measuring currents, for example, wherein currents and voltages are typically known in a regulation. Either a recalibration of the current control loop or a check of the actuator (inverter) would then be recommended here.

If the speed control loop becomes unstable, the connecting elements are usually the cause. If the mechanical structure is known, for example, due to a user query during startup, it is then possible to distinguish on the basis of the combination of EO values and LD events, for example, between a changed belt tension and a changed slack, from which a corresponding action recommendation can be derived.

The invention claimed is:

1. A method for automatic stability detection of a regulator cascade having a number of cascaded regulators, wherein a regulation error of a respective regulator is processed by the respective regulator and the processed regulation error is output as a regulator manipulated variable, wherein a reference variable for a respectively downstream regulator in the regulator cascade is ascertained as a function of the regulator manipulated variable, the method comprising the steps of:

a) ascertaining an energy content of a respective regulation error, b) ascertaining whether an absolute value of a respective regulator manipulated variable exceeds an associated limiting value or not, and c) generating a stability measure for the regulator cascade as a function of the energy contents of the respective regulation errors and as a function of whether the respective regulator manipulated variables exceed their associated limiting values or not;

wherein:

steps a) and c) are repeated in a fixed time grid; and regulations of the cascaded regulators are executed on a computer in the fixed time grid and in a defined sequence.

2. The method according to claim 1, wherein the energy content of the respective regulation error is ascertained by way of energy operators.

3. The method according to claim 1, wherein upon an increase of the energy contents of the respective regulation errors, the stability measure is generated so as to indicate an increasing instability of the regulator cascade.

4. The method according to claim 1, wherein for the case that the absolute values of the respective regulator manipulated variables exceed their associated limiting values, the stability measure is generated so as to indicate an increasing instability of the regulator cascade.

5. The method according to claim 1, wherein the regulators of the regulator cascade are selected from a group of regulators consisting of:

position regulators,
speed regulators, and
current regulators.

6. The method according to claim 1, further comprising: generating diagnosis and action information as a function of the energy contents of the respective regulation errors and as a function of whether the absolute values of the reference variables generated in each case by way of the regulators exceed their associated limiting values or not.

7. The method according to claim 1, wherein the stability measure is further generated as a function of predeterminable properties of the regulator cascade.

8. The method of claim 1, wherein the number of cascaded regulators comprise at least two regulators connected in series that are different types of regulators selected from a group of regulators consisting of: position regulators, speed regulators, and current regulators.

* * * * *